(12) United States Patent
Setaki et al.

(10) Patent No.: US 10,267,017 B2
(45) Date of Patent: Apr. 23, 2019

(54) SMALL-SIZED CONSTRUCTION MACHINE

(71) Applicant: Hitachi Construction Machinery Tierra Co., Ltd., Koka-shi, Shiga (JP)

(72) Inventors: Masashi Setaki, Kameoka (JP); Tomoyuki Tanaka, Yasu (JP); Junya Kawamoto, Moriyama (JP)

(73) Assignee: Hitachi Construction Machinery Tierra Co., Ltd., Koka-shi (JP)

(*) Notice: Subject to any disclaimer, the term of this patent is extended or adjusted under 35 U.S.C. 154(b) by 0 days.

(21) Appl. No.: 15/759,401

(22) PCT Filed: Nov. 1, 2016

(86) PCT No.: PCT/JP2016/082453
§ 371 (c)(1),
(2) Date: Mar. 12, 2018

(87) PCT Pub. No.: WO2017/110256
PCT Pub. Date: Jun. 29, 2017

(65) Prior Publication Data
US 2018/0258612 A1 Sep. 13, 2018

(30) Foreign Application Priority Data
Dec. 26, 2015 (JP) ................. 2015-255488

(51) Int. Cl.
*E02F 3/32* (2006.01)
*E02F 9/20* (2006.01)
(Continued)

(52) U.S. Cl.
CPC ............ *E02F 9/2004* (2013.01); *E02F 3/325* (2013.01); *E02F 9/16* (2013.01); *E02F 3/964* (2013.01); *E02F 9/0875* (2013.01); *E02F 9/18* (2013.01)

(58) Field of Classification Search
CPC ... E02F 3/325; E02F 3/964; E02F 9/16; E02F 9/18; E02F 9/2004; E02F 9/2267
(Continued)

(56) References Cited

U.S. PATENT DOCUMENTS 4,157,740 A * 6/1979 Jackson ................. B60K 20/04
180/328
4,991,457 A * 2/1991 Chen .................... F16H 59/0213
277/640
(Continued)

FOREIGN PATENT DOCUMENTS

JP  2009-299396 A  12/2009
JP  2011-064064 A  3/2011
JP  2011-116482 A  6/2011

OTHER PUBLICATIONS

International Search Report (PCT/ISA/210) issued in PCT Application No. PCT/JP2016/082453 dated Jan. 24, 2017 with English translation (six (6) pages).
(Continued)

*Primary Examiner* — Ronald P Jarrett
*Assistant Examiner* — Brendan P Tighe
(74) *Attorney, Agent, or Firm* — Crowell & Moring LLP

(57) ABSTRACT

A floor-plate side opening part (17B) through which each lever part (24, 26) of a traveling lever pedal (21) is inserted is provided on a front side of a floor plate (18). A mat-side opening part (19C) corresponding to the floor-plate side opening part (17B) is provided on a floor mat (19). A cover member (32) formed of a flat plate part (33) covering the mat-side opening part (19C) and having a slit (33A, 33B) allowing tilting of each lever part (24, 26) and a cylindrical part (34) extending from the flat plate part (33) is provided on the mat-side opening part (19C). An entire-circumferential lip part (19D) is provided on the mat-side opening part 19C. An entire-circumferential stepped part (35) for sealing
(Continued)

a space from the entire-circumferential lip part (19D) is provided on the flat plate part (33). An entire-circumferential engaging protrusion part (17C) is provided on the floor-plate side opening part (17B), and an entire-circumferential recessed groove (36) engaged with the entire-circumferential engaging protrusion part (17C) is provided on the cylindrical part (34).

6 Claims, 10 Drawing Sheets

(51) Int. Cl.
*E02F 9/16* (2006.01)
*E02F 3/96* (2006.01)
*E02F 9/18* (2006.01)
*E02F 9/08* (2006.01)

(58) Field of Classification Search
USPC .............................................................. 74/18
See application file for complete search history.

(56) References Cited

U.S. PATENT DOCUMENTS

| | | | |
|---|---|---|---|
| 5,740,698 A * | 4/1998 | Myronuk | A62C 2/06 180/346 |
| 5,749,261 A * | 5/1998 | Numakami | B60K 20/04 464/175 |
| 5,975,609 A * | 11/1999 | Campbell | B60R 13/083 181/284 |
| 2007/0205033 A1* | 9/2007 | Hanson | B60T 7/06 180/90.6 |
| 2009/0309343 A1 | 12/2009 | Fujii et al. | |
| 2012/0228837 A1* | 9/2012 | Gorham | F16J 15/062 277/650 |

OTHER PUBLICATIONS

Japanese-language Written Opinion (PCT/ISA/237) issued in PCT Application No. PCT/JP2016/082453 dated Jan. 24, 2017 (three (3) pages).

\* cited by examiner

SMALL-SIZED CONSTRUCTION MACHINE

TECHNICAL FIELD

The present invention relates to a construction machine such as a hydraulic excavator or the like and particularly to a small-sized construction machine in which a traveling lever pedal for operating a lower traveling structure is disposed by being located on a front side of a floor plate.

BACKGROUND ART

In general, a hydraulic excavator which is s typical example of a construction machine is constituted by an automotive lower traveling structure, an upper revolving structure rotatably mounted on the lower traveling structure, and a front device provided on a front side of the upper revolving structure, capable of moving upward/downward.

Here, the hydraulic excavator includes a small-sized hydraulic excavator for performing a work in a small work site or the like. This small-sized hydraulic excavator is usually called a mini-shovel, and since it is used for a demolition work inside a building or an excavating work in a small place on a street or the like, a machine weight is kept to approximately 0.7 to 8 tons, for example. Accordingly, in the small-sized hydraulic excavator, an entire vehicle body including the lower traveling structure and the upper revolving structure is formed in a compact manner.

The upper revolving structure of the small-sized hydraulic excavator includes a revolving frame forming a support structural body, a counterweight provided on a rear side of the revolving frame in order to take a balance with the front device, a prime mover such as an engine or the like provided on a front side of the counterweight and provided on the revolving frame, an operator's seat platform provided by covering an upper side of the prime mover and having an operator's seat, a floor plate provided on a front side of the operator's seat platform and on the revolving frame, a floor mat provided on the floor plate, and a traveling lever pedal supported by the revolving frame on the front side of the revolving frame, having a rotational shaft which becomes a rotational center on a side lower than the floor plate, and having a base end mounted on the rotational shaft and a distal end protruding upward through the floor mat.

The small-sized hydraulic excavator constituted as above has width dimensions in a left and right direction of the lower traveling structure and the upper revolving structure set small by considering necessity of passing through a narrow street or an entrance of a building and transportation by a small-sized truck. Moreover, length dimension in a front and rear direction of the upper revolving structure is designed in a compact manner within a range where an occupying space for an operator can be ensured.

As described above, in the small-sized hydraulic excavator, a lever part of the traveling lever pedal protrudes upward through an opening part formed in the floor mat. The operator can operate traveling of the lower traveling structure by grabbing and tilting a distal end of this lever part in the front and rear direction. In this case, since the opening part in the floor mat is formed large so that the tilted lever part does not interfere, there is a concern that earth and sand or water can enter below the floor through the opening part. Thus, a small-sized hydraulic excavator in which a bellows-shaped boot covering a gap between the opening part in the floor mat and the lever part is provided is known (Patent Document 1).

PRIOR ART DOCUMENT

Patent Document

Patent Document 1: Japanese Patent Laid-Open No. 2009-299396 A

SUMMARY OF THE INVENTION

Incidentally, the hydraulic excavator according to Patent Document 1 has the bellows-shaped boot provided on the opening part in the floor mat, and this boot protrudes to an upper side from the floor mat. Thus, in Patent Document 1, there is a problem that when the pedal part is to be mounted on the lever part while avoiding the boot, a position of the pedal part becomes high, and operability becomes poor.

The present invention was made in view of the aforementioned prior art problem, and an object of the present invention is to provide a small-sized construction machine in which a mounting position of the pedal part of the traveling lever pedal is disposed at a low position which is favorable in operation, whereby operability of this pedal part is improved while a gap between a mat-side opening part of a floor mat and the lever part of the traveling lever pedal is covered.

In the present invention, a small-sized construction machine comprising: an automotive lower traveling structure; an upper revolving structure rotatably mounted on the lower traveling structure; and a front device provided on a front side of the upper revolving structure, wherein the upper revolving structure includes: a revolving frame forming a support structural body; a counterweight provided on a rear side of the revolving frame in order to take a balance with the front device; a prime mover provided on a front side of the counterweight and on the revolving frame; an operator's seat platform provided by covering an upper side of the prime mover and having an operator's seat; a floor plate provided on a front side of the operator's seat platform and on the revolving frame; a floor mat provided on the floor plate; and a traveling lever pedal supported by the revolving frame on a front side of the revolving frame, having a lever part having a rotational shaft which becomes a rotational center on a side lower than the floor plate and having a base end mounted on the rotational shaft and a distal end protruding upward through the floor mat, the lever part being tilted in a front and rear direction so as to operate traveling of the lower traveling structure; characterized in that: the floor plate is provided with a floor-plate side opening part through which the lever part of the traveling lever pedal is inserted at a front-side position; the floor mat is provided with a mat-side opening part at a position corresponding to the floor-plate side opening part; a cover member including a flat plate part covering the mat-side opening part and having a slit through which the lever part of the traveling lever pedal is tiltably inserted in the front and rear direction and a cylindrical part extending downward from the flat plate part toward the floor-plate side opening part of the floor plate is provided on the mat-side opening part of the floor mat; a floor-mat side seal section is provided on the mat-side opening part of the floor mat; a cover-member side seal section sealing a space with the floor-mat side seal section of the floor mat in a liquid-tight state is provided on an outer peripheral edge of the flat plate part of the cover member; a floor-plate side engaging section is provided on the floor-plate side opening part of the floor plate; and a cover-member side engaging section engaged with the floor-plate side engaging section of the floor plate is provided on the cylindrical part of the cover member.

According to the present invention, a mounting position of the pedal part of the traveling lever pedal can be disposed at a low position which is favorable in operation, while the gap between the mat-side opening part of the floor mat and the lever part of the traveling lever pedal is covered, and operability of this pedal part can be improved.

MODE FOR CARRYING OUT THE INVENTION

Hereinafter, a small-sized hydraulic excavator with a cab specification or a so-called mini-shovel as a typical example of a small-sized construction machine according to an embodiment of the present invention will be explained in detail with reference to the attached drawings.

Figure 1:
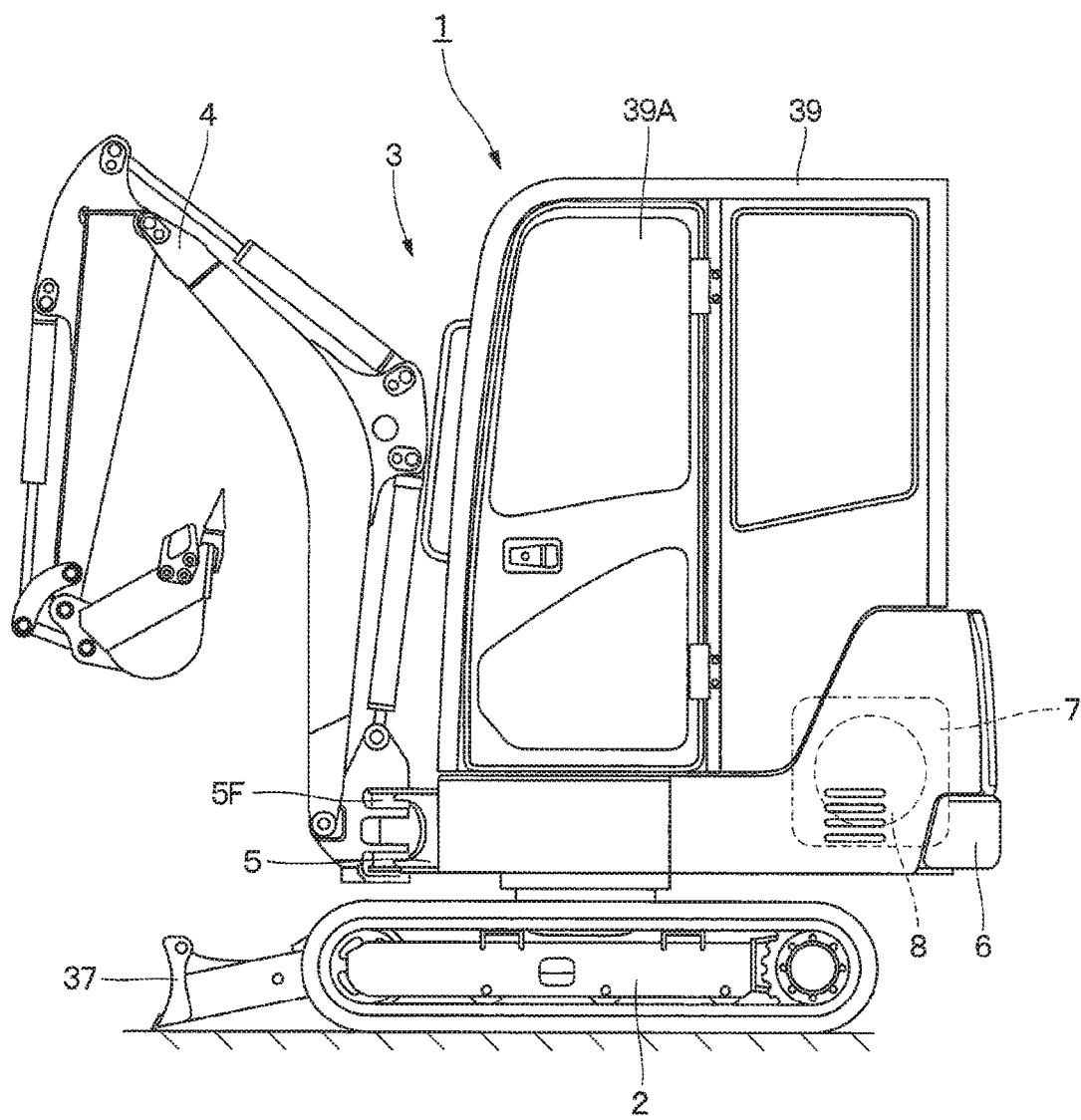
FIG. 1 is a front view showing a small-sized hydraulic excavator according to a first embodiment of the present invention.

First, FIG. 1 to FIG. 8 show a first embodiment of the present invention. In FIG. 1, a hydraulic excavator 1 as a construction machine is constituted as a small-sized hydraulic excavator (mini-shovel) with a cab specification. This small-sized hydraulic excavator 1 includes a self-propelled crawler-type lower traveling structure 2 using a hydraulic motor (not shown) as a driving source and an upper revolving structure 3 rotatably mounted on the lower traveling structure 2.

A swing-type front device 4 is swingably provided on a front side of the upper revolving structure 3 in a left and right direction, and this front device 4 performs an excavating work of earth and sand by rotating with a plurality of hydraulic cylinders as driving sources.

Here, since the small-sized hydraulic excavator 1 is used in a disassembling work inside a building, an excavating work in a small place such as a street or the like, a machine weight (total weight) is suppressed to approximately 0.7 to 8 tons, for example.

Figure 2:
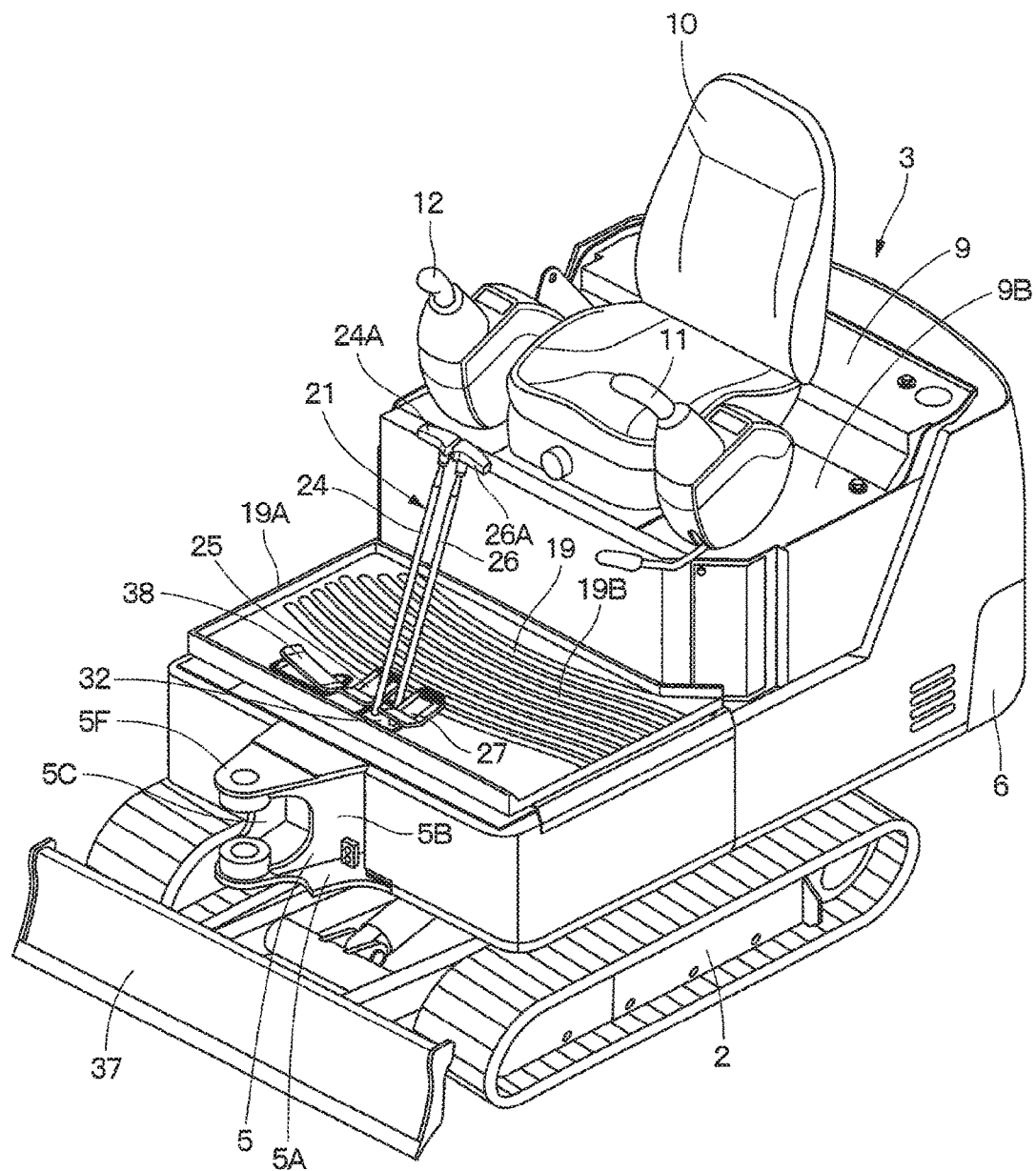
FIG. 2 is a perspective view of the hydraulic excavator in FIG. 1 in a state where a front device and a cab are omitted when seen from a front left side.
Figure 3:
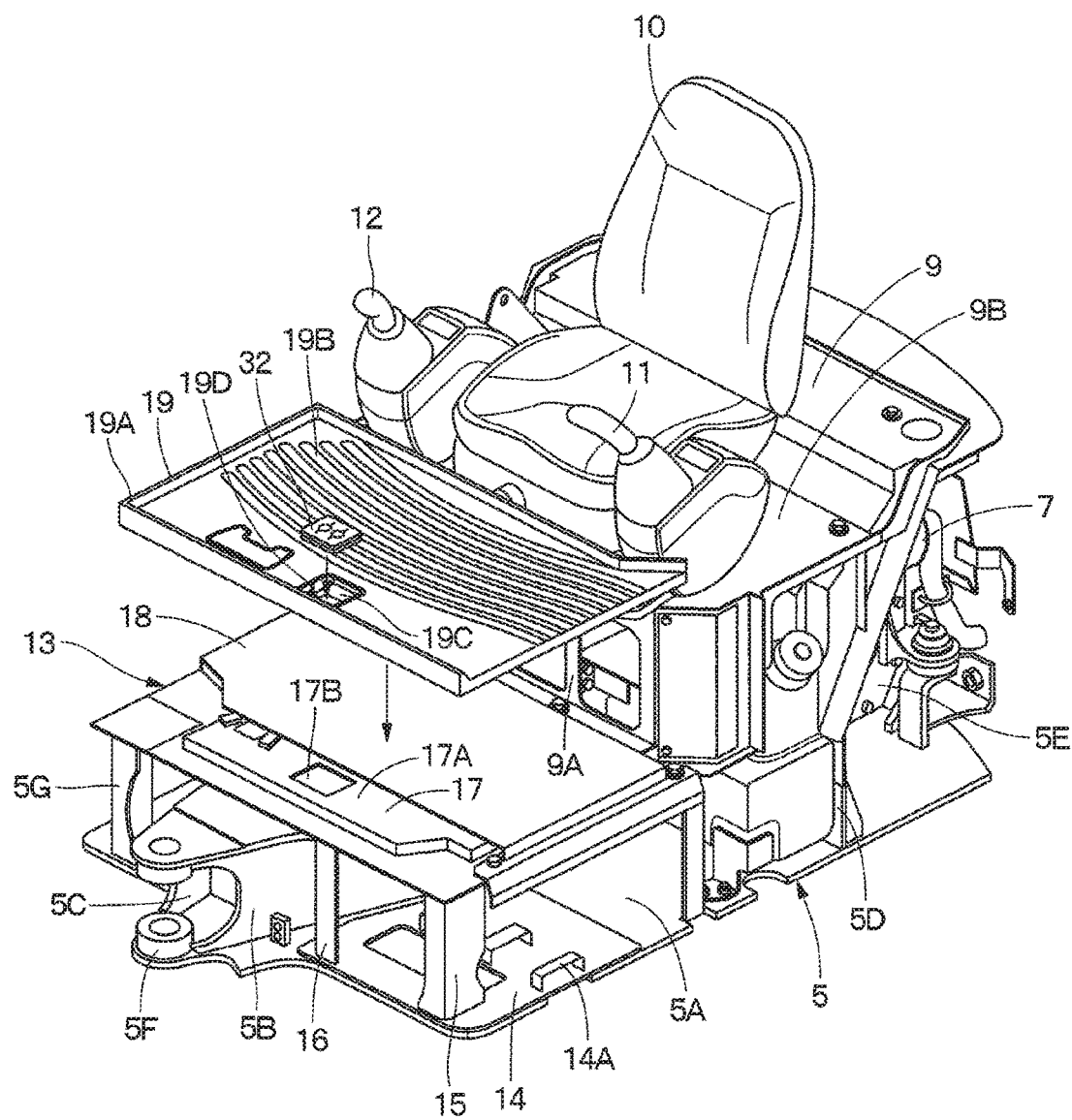
FIG. 3 is an exploded perspective view showing a state where a floor mat and a cover member are exploded with respect to an assembly including a revolving frame, an operator's seat platform, and a floor plate.

The upper revolving structure 3 has a width dimension in the left and right direction substantially equal to a vehicle width of the lower traveling structure 2. Moreover, a length dimension of the upper revolving structure 3 in the front and rear direction is designed compact within a range capable of ensuring an occupying space for an operator. In this case, as shown in FIG. 2 and FIG. 3, the small-sized hydraulic excavator 1 is made compact by disposing the operator's seat 10 on an upper side of an engine 7 which will be described later through an operator's seat platform 9 or making a floor plate 18 on which the operator places his/her foot small, for example.

The revolving frame 5 forms a support structural body for the upper revolving structure 3. As shown in FIG. 3, the revolving frame 5 is constituted by including a bottom plate 5A made of a thick steel plate having a substantially rectangular shape extending in the front and rear direction, a front left vertical plate 5B and a front right vertical plate 5C provided upright by extending having a V-shape so that they get closer to each other toward the front side on the bottom plate 5A, a lateral plate 5D located on a rear part of each of the front vertical plates 5B and 5C and provided upright by extending in the left and right direction, a rear left vertical plate 5E and a rear right vertical plate (not shown) extending from the lateral plate 5D to the rear side at an interval in the left and right direction. A front part of each of the front vertical plates 5B and 5C is a support bracket 5F swingably supporting the front device 4 in the left and right direction.

On the other hand, a front right column 5G supporting a right side of a front frame member 13 which will be described later and a front right part of the floor plate 18 is provided upright on a front right part of the revolving frame 5, that is, on a front right corner part of the bottom plate 5A. Moreover, a front frame member 13 constituting apart of the revolving frame 5 and a part of the floor plate 18 which will be described later are provided on a front side position of the bottom plate 5A of the revolving frame 5.

The counterweight 6 is mounted on a rear side of the revolving frame 5 (see FIG. 1). This counterweight 6 acts as a weight balance to the front device 4 and is constituted as a heavy article molded by using casting, for example.

As shown in FIG. 1 and FIG. 3, the engine 7 constitutes a prime mover for driving a hydraulic pump 8 which will be described later. The engine 7 is located on the front side of the counterweight 6 and is disposed on the rear side of the revolving frame 5 in a laterally placed state extending in the left and right direction.

In the engine 7, the hydraulic pump 8 (shown by a dot line in FIG. 1) is provided at a location on a left side in the left and right direction, for example, while a cooling fan (not shown) is provided on a right side. The hydraulic pump 8 is to supply an hydraulic oil (pressurized oil) to a hydraulic motor of the lower traveling structure 2, a hydraulic cylinder of the front device 4, and a hydraulic motor (not shown) of the revolving device through a control valve group 20 which will be described later by being driven by the engine 7. Moreover, a heat exchanger (not shown) for cooling a fluid containing an engine cooling water and the hydraulic oil is provided at a position faced with the cooling fan. It should be noted that as a prime mover, a hybrid-type prime mover in which an electric prime mover for assist is provided in the engine can be also used or only the electric prime mover can be also used as a prime mover.

As shown in FIGS. 2 and 3, the operator's seat platform 9 is to cover the engine 7, the hydraulic pump 8, and the heat exchanger and to support the operator's seat 10 which will be described later. That is, the operator's seat platform 9 is constituted by including a front surface plate 9A provided upright on the revolving frame 5 from a front side of the engine 7 and a seat mounting plate 9B extending from an upper part of the front surface plate 9A to a rear side and covering the upper side of the engine 7 and the like. The operator's seat 10 which will be described later and left and right control levers 11 and 12 are mounted on an upper side of the seat mounting plate 9B.

The operator's seat 10 is provided at a center position of the seat mounting plate 9B constituting the operator's seat platform 9. This operator's seat 10 is for the operator who operates the hydraulic excavator 1 to sit on. Moreover, the left and right control levers 11 and 12 for work for operating the front device 4 and the revolving device are disposed on both left and right sides of the operator's seat 10.

Subsequently, a constitution of the front frame member 13 forming a part of a characterized portion of this embodiment provided on the front side of the revolving frame 5 will be described.

Figure 4:
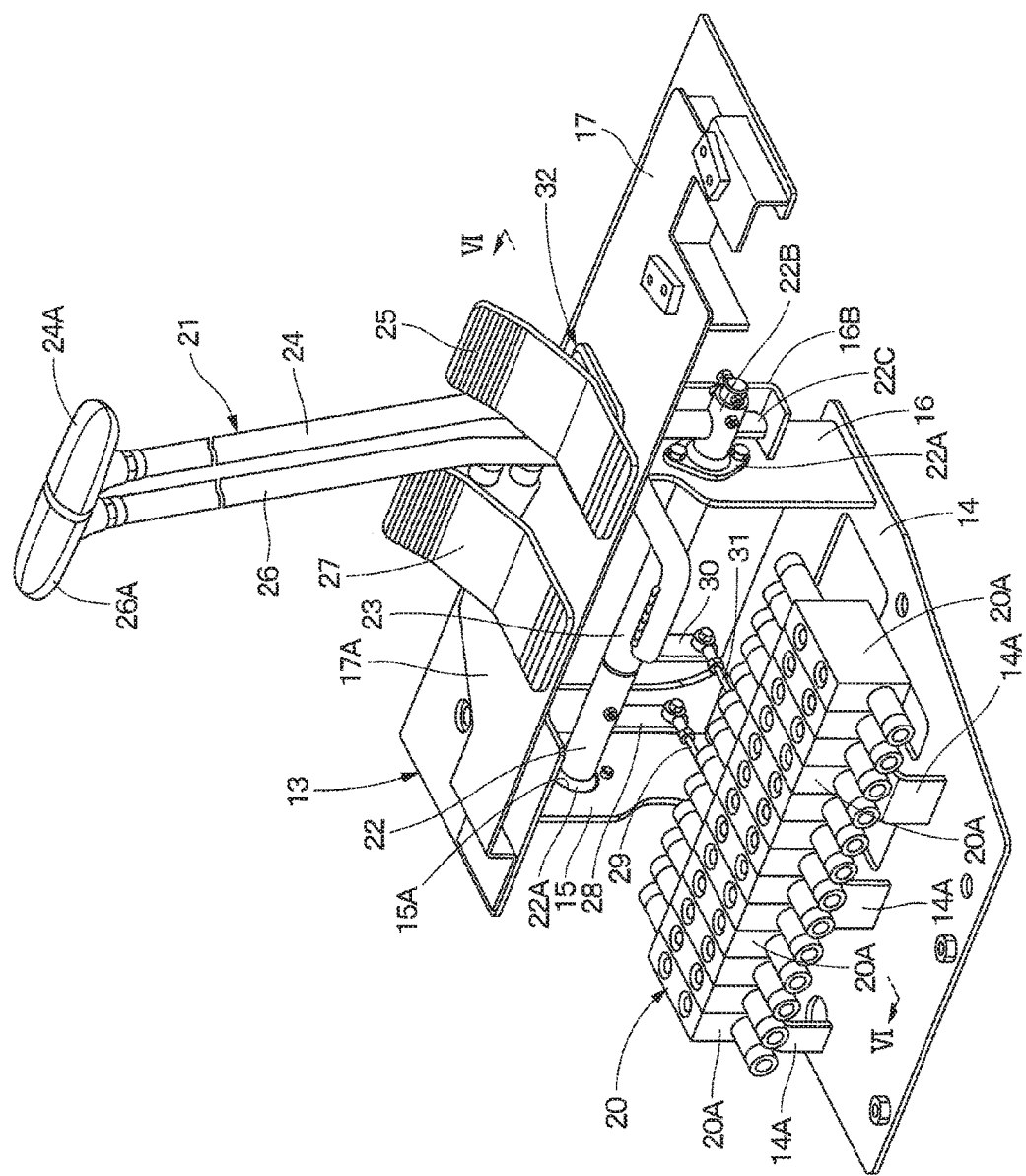
FIG. 4 is a perspective view of a front frame member, a control valve group, and a traveling lever pedal in FIG. 3 when seen from a rear right side in an enlarged manner.

As shown in FIG. 3, the front frame member 13 is provided on the front side of the revolving frame 5. As shown in FIG. 4, the front frame member 13 becomes abase frame of a sub assembly on which the control valve group 20 which will be described later and the traveling lever pedal 21 are assembled. As a result, the control valve group 20 and the traveling lever pedal 21 can be assembled on the front frame member 13 in a large place different from the main assembling site. Moreover, an adjustment work between a control valve 20A for hydraulic motor included in the control valve group 20 and the traveling lever pedal 21 can be efficiently performed in advance in a large place.

The front frame member 13 is constituted by including a substantially rectangular bottom surface plate 14 faced with the bottom plate 5A of the revolving frame 5, an angle-shaped left column 15 provided upright on a corner part on a front left side of the bottom surface plate 14, an angle-shaped right column 16 provided upright on a corner part on a front right side of the bottom surface plate 14 so as to face the left column 15 in the left and right direction, and an upper surface plate 17 located on the front side and provided by extending in the left and right direction on upper parts of the left column 15 and the right column 16.

Figure 5:
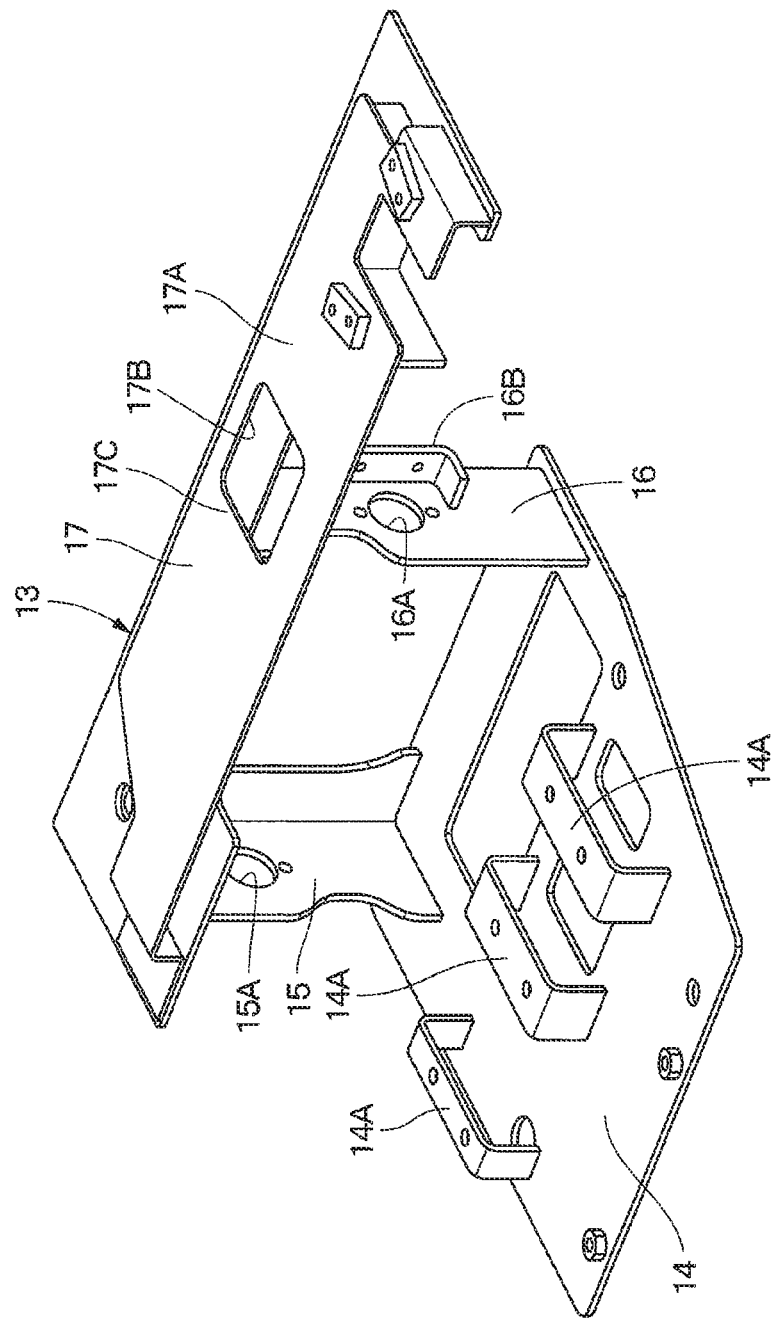
FIG. 5 is a perspective view showing the front frame member in FIG. 4 as a single unit.

As shown in FIG. 3, the bottom surface plate 14 is bolted at a front left position of the bottom plate 5A of the revolving frame 5 or more specifically, on the left side of the front left vertical plate 5B and closer to a front side position than the lateral plate 5D. As shown in FIG. 5, a plurality of control valve mounting bases 14A or three units thereof, for example, are provided on the bottom surface plate 14 at an interval in the left and right direction at a location in a middle part in the front and rear direction. The control valve group 20 is mounted on these control valve mounting bases 14A.

A rotational shaft insertion hole 15A is provided by penetrating the left column 15 in the left and right direction at a location in the vicinity of a lower side of the upper surface plate 17. On the other hand, a rotating shaft insertion hole 16A is provided by penetrating the right column 16 in the left and right direction so as to be located on the same axis of the rotational shaft insertion hole 15A. A rotational shaft 22 of the traveling lever pedal 21 which will be described later is inserted into the rotational shaft insertion hole 15A of the left column 15 and the rotating shaft insertion hole 16A of the right column 16, respectively.

Figure 6:
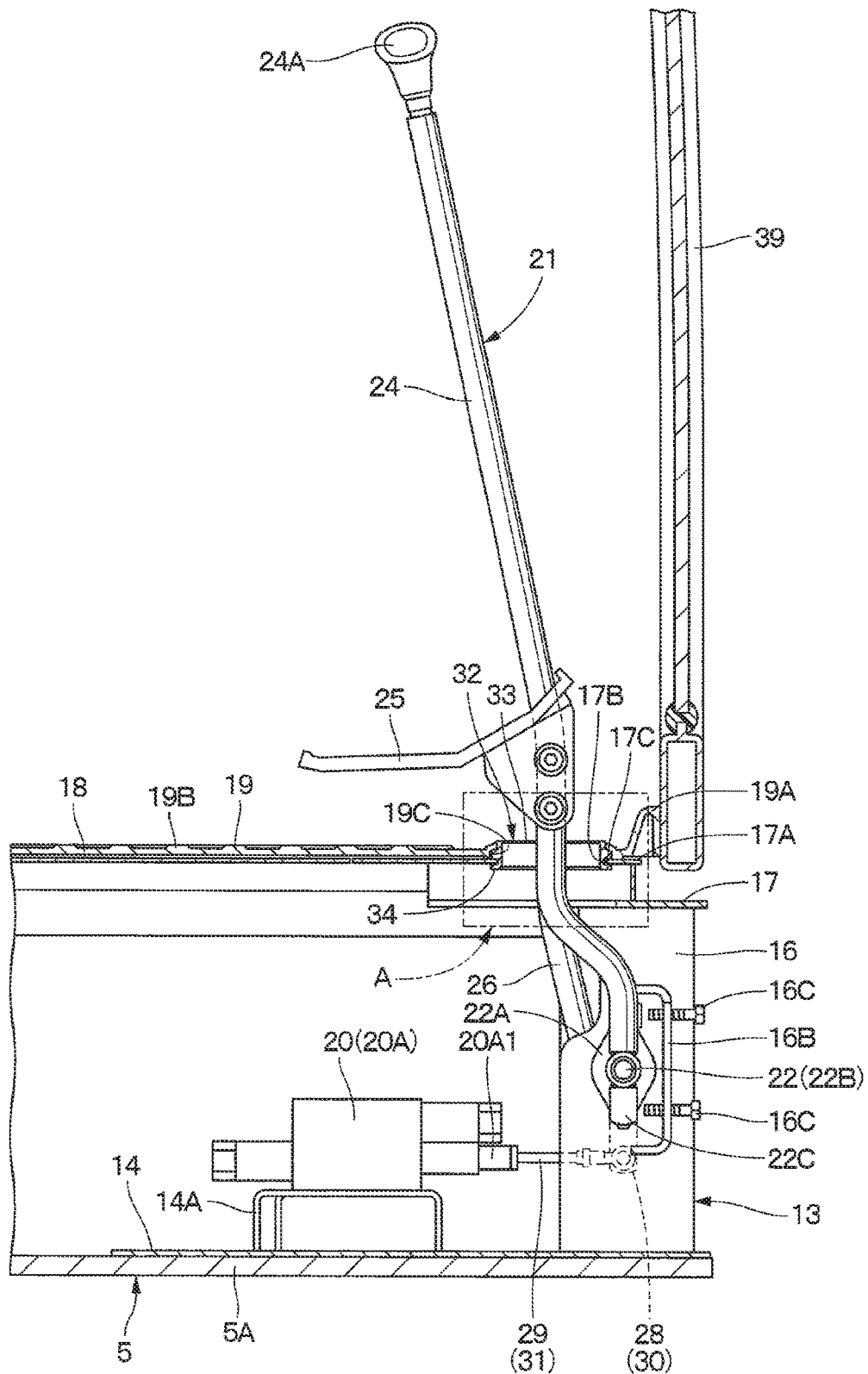
FIG. 6 is a sectional view of an enlarged essential part of a connection state between the control valve group and the traveling lever pedal when seen from an arrow VI-VI direction in FIG. 4.

Moreover, a bracket 16B is provided on a right side position of the right column 16 at a location on a front side of the rotating shaft insertion hole 16A. As shown in FIG. 6, two adjustment bolts 16C for adjusting a tilting (rotating) angle of a right lever part 24 of the traveling lever pedal 21 are mounted on this bracket 16B at an interval in an upper and lower direction. Moreover, a bracket on which an adjustment bolt for adjusting a tilting angle of a left lever part 26 of the traveling lever pedal 21 is mounted (none of them is shown) is provided on a left surface side of the right column 16.

The upper surface plate 17 constitutes a part of a front side portion of the floor plate 18 which will be described later. An operation system mounting plate 17A is formed on this upper surface plate 17 at a position higher by one stage so as be flush with the floor plate 18. A floor-plate side opening part 17B is provided on the operation system mounting plate 17A at a center position in the left and right direction or in detail at a position in the vicinity of the right side of the right column 16. The left lever part 24 and the right lever part 26 of the traveling lever pedal 21 to be inserted in the floor-plate side opening part 17B.

Figure 7:
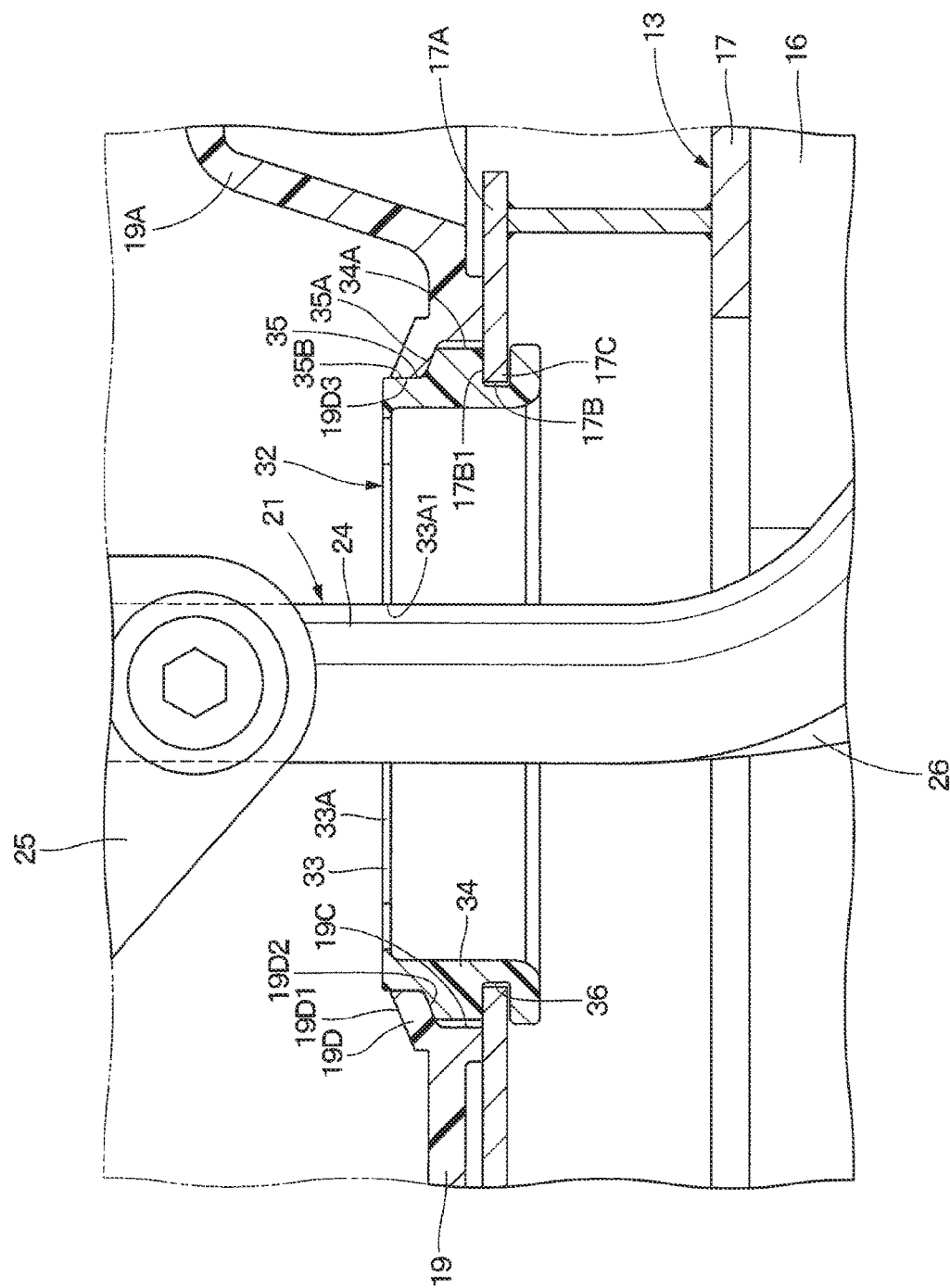
FIG. 7 is an enlarged sectional view of an essential part showing an A part in FIG. 6.

Here, the floor-plate side opening part 17B is formed as a sufficiently large rectangular opening so that the left lever part 24 and the right lever part 26 tilted (rotated) in the front and rear direction are not brought into contact therewith. As shown in FIG. 7, an end part on an inner side of the floor-plate side opening part 17B is an entire-circumferential engaging protrusion part 17C as a floor-plate side engaging section protruding toward an entire-circumferential recessed groove 36 of a cover member 32 which will be described later. This entire-circumferential engaging protrusion part 17C is to fix the cover member 32 at a predetermined position on the upper surface plate 17, that is, on the floor-plate side opening part 17B in a positioned state by engaging together with the entire-circumferential recessed groove 36.

As shown in FIGS. 3 and 6, the floor plate 18 is provided on the revolving frame 5 on the front side of the operator's seat platform 9. The floor plate 18 has its front side mounted on the upper surface plate 17 of the front frame member 13 and its rear side mounted on the front surface plate 9A of the operator's seat platform 9. The floor plate 18 constitutes a foot placing member on which the operator places his/her foot and is formed having a flat rectangular shape lengthy in the left and right direction.

A floor mat 19 is provided on the floor plate 18 (see FIGS. 2 and 3). The floor mat 19 is formed having a rectangular shape lengthy in the left and right direction by using a resin material (rubber material) having elasticity so as to cover the floor plate 18 including the upper surface plate 17 of the front frame member 13. A frame member 19A rises on the periphery of the floor mat 19 excluding the left side which is an entrance side. Moreover, a rear side portion from a middle portion excluding the front side portion in the floor mat 19 is formed as a foot rest part 19B on which the operator places his/her foot.

A mat-side opening part 19C is provided in the floor mat 19 at a middle position on the front side in the left and right direction or more specifically, at a position corresponding to the floor-plate side opening part 17B of the upper surface plate 17. This mat-side opening part 19C is formed as a rectangular opening having a dimension larger than the cover member 32.

An entire-circumferential lip part 19D as a floor-mat side seal section sealing a space between the floor mat 19 and the cover member 32 in a liquid-tight state is integrally provided on the mat-side opening part 19C. As shown in FIG. 7, the entire-circumferential lip part 19D is constituted as an inclined lip part engaged with the entire-circumferential stepped part 35 by extending by protruding diagonally upward toward the entire-circumferential stepped part 35 of the cover member 32. As a result, the entire-circumferential lip part 19D of the mat-side opening part 19C can prevent earth and sand or water from moving toward the cover member 32 by inclination of its upper surface 19D1.

On the other hand, a lower surface 19D2 and an inner side surface 19D3 of the entire-circumferential lip part 19D can seal the space between the floor mat 19 and the cover member 32 in the liquid-tight state by being brought into elastic and close contact with the entire-circumferential stepped part 35 of the cylindrical part 34 constituting the cover member 32 which will be described later.

As shown in FIG. 4 and FIG. 6, the control valve group 20 is mounted on each of the control valve mounting bases 14A of the bottom surface plate 14 in the front frame member 13. The control valve group 20 is constituted by aligning and connecting a plurality of control valves 20A in the left and right direction. Each of the control valves 20A is to supply/discharge the pressurized oil toward the hydraulic motor for traveling of the lower traveling structure 2 by the operation of the traveling lever pedal 21 which will be described later. Moreover, each of the control valves 20A is to supply/discharge the pressurized oil toward the plurality of hydraulic cylinders of the front device 4 and the hydraulic motor of the revolving device by the operation of the left and right control levers 11 and 12.

Here, the two control valves 20A disposed in the vicinity of the center, for example, in each of the control valves 20A are to supply/discharge the pressurized oil to the hydraulic motor for the lower traveling structure 2. The control valve 20A located on the left side in the two control valves 20A has its pilot part 20A1 (see FIG. 6) directly connected to the right lever part 24 through a rod 29 or the like which will be described later. On the other hand, the control valve 20A located on the right side has its pilot part 20A1 mechanically (directly) connected to the left lever part 26 through a rod 31 or the like.

The traveling lever pedal 21 is supported by the front frame member 13 constituting a part of the revolving frame 5. The traveling lever pedal 21 is tiltably (rotatably) mounted on a side lower than the upper surface plate 17 forming a part of the floor plate 18, that is, in the front and rear direction with respect to the left column 15 and the right column 16. The traveling lever pedal 21 is to operate traveling of the lower traveling structure 2 through the corresponding control valve 20A by tilting the right lever part 24 and the left lever part 26 which will be described later. The traveling lever pedal 21 is constituted by including the rotational shaft 22, a cylindrical rotational shaft 23, the right lever part 24, and the left lever part 26, which will be described later.

The rotational shaft 22 constituting the traveling lever pedal 21 constitutes a rotational center on the side lower than the upper surface plate 17. The rotational shaft 22 is extended in the left and right direction, inserted into the rotation shaft insertion holes 15A and 16A of the left column 15 and the right column 16 and rotatably mounted on each of the columns 15 and 16 through a bearing block (pillow block) 22A. A stopper part 22C extending in a radial direction is provided on a protruding end 22B protruding to the right side from the right column 16 in the rotational shaft 22. On the other hand, a rotational piece 28 which will be described later is mounted correspondingly to the control valve 20A for the hydraulic motor, closer to the left side of the rotational shaft 22.

The cylindrical rotational shaft 23 is formed as a cylindrical body (pipe member) extending in the left and right direction. This cylindrical rotational shaft 23 is disposed on a side opposite to the protruding end 22B across the right column 16 and is mounted on an outer peripheral side of the rotational shaft 22, capable of relative rotation with the rotational shaft 22. A rotational piece 30, which will be described later, is mounted closer to the left side of the cylindrical rotational shaft 23, correspondingly to another control valve 20A for the hydraulic motor.

The right lever part 24 is to rotate the rotational shaft 22 and has its base end (lower end) mounted on the protruding end 22B of the rotational shaft 22. On the other hand, the right lever part 24 is extended to an upper side through the floor-plate side opening part 17B of the upper surface plate 17 constituting the front frame member 13 and the mat-side opening part 19C of the floor mat 19. In this case, the right lever part 24 is extended to the upper side through a right slit 33A provided in the flat plate part 33 of the cover member 32, and a grip 24A gripped by the operator is provided on its distal end (upper end). Here, the base end of the right lever part 24 is positioned on a side opposite to the stopper part 22C across the rotational center of the rotational shaft 22 and is fixed to the rotational shaft 22 by welding means.

A right pedal part 25 is located on a side upper than the floor mat 19 and is provided on the right side of the right lever part 24. The right pedal part 25 is fixed to the right lever part 24 by using a bolt. Here, the cover member 32 which will be described later is formed with a height dimension low as a member covering a gap between the mat-side opening part 19C and the floor-plate side opening part 17B and each of the lever parts 24 and 26 of the traveling lever pedal 21. Accordingly, the right pedal part 25 can be disposed at a lower position closer to the floor mat 19 due to the lowered height dimension of the cover member 32. As a result, the operator can easily place the foot on the right pedal part 25 and can perform a step-on operation on this right pedal part 25 easily and accurately.

The left lever part 26 is to rotate the cylindrical rotational shaft 23 and has the base end (lower end) mounted on an outer peripheral surface of the cylindrical rotational shaft 23. On the other hand, the left lever part 26 is extended to an upper side by passing through the floor-plate side opening part 17B of the upper surface plate 17 and the mat-side opening part 19C of the floor mat 19 so as to follow the right lever part 24. In this case, the left lever part 26 is extended to the upper side through a left slit 33B in the flat plate part 33, and its distal end (upper end) is a grip 26A. Here, the base end of the left lever part 26 is bent into a J-shape and is extended in parallel with the cylindrical rotational shaft 23, and this parallel part is fixed to the cylindrical rotational shaft 23.

The left pedal part 27 is located on a side upper than the floor mat 19 substantially similarly to the right pedal part 25 and is provided on the left side of the left lever part 26. The left pedal part 27 is mounted at a low position closer to the floor mat 19 with respect to the left lever part 26. As a result, the operator can perform the step-on operation on the left pedal part 27 easily and accurately, too, similarly to the right pedal part 25.

The rotational piece 28 for the right lever part 24 is made of a rectangular plate body and is provided closer to the left side of the rotational shaft 22 so as to correspond to the control valve 20A for supplying/discharging the pressurized oil to the hydraulic motor on the right side. The rotational piece 28 is fixed to the outer peripheral surface of the rotational shaft 22 so as to extend immediately downward from the rotational shaft 22 when the right lever part 24 is at a neutral position, for example.

The rod 29 for the right lever part 24 is provided as a rod-shaped body connecting the distal end part of the rotational piece 28 and the pilot part 20A1 of the control valve 20A for the hydraulic motor on the right side. As a result, the right lever part 24 and the control valve 20A for the hydraulic motor on the right side are mechanically (directly) connected.

The rotational piece 30 for the left lever part 26 is made of a rectangular plate body similarly to the rotational piece 28 for the right lever part 24 and provided on the cylindrical rotational shaft 23 so as to correspond to the control valve 20A for supplying/discharging the pressurized oil to the hydraulic motor on the left side. The rotational piece 30 is fixed to the outer peripheral surface of the cylindrical rotational shaft 23 so as to extend immediately downward from the cylindrical rotational shaft 23 when the left lever part 26 is at the neutral position, for example.

The rod 31 for the left lever part 26 is provided as a rod-shaped body connecting the distal end part of the rotational piece 30 and the pilot part 20A1 of the control valve 20A for the hydraulic motor on the left side. As a result, the left lever part 26 and the control valve 20A for the hydraulic motor on the left side are mechanically (directly) connected.

Subsequently, a constitution of the cover member 32 forming the characterized portion of this embodiment provided on the mat-side opening part 19C of the floor mat 19 will be described.

Figure 8:
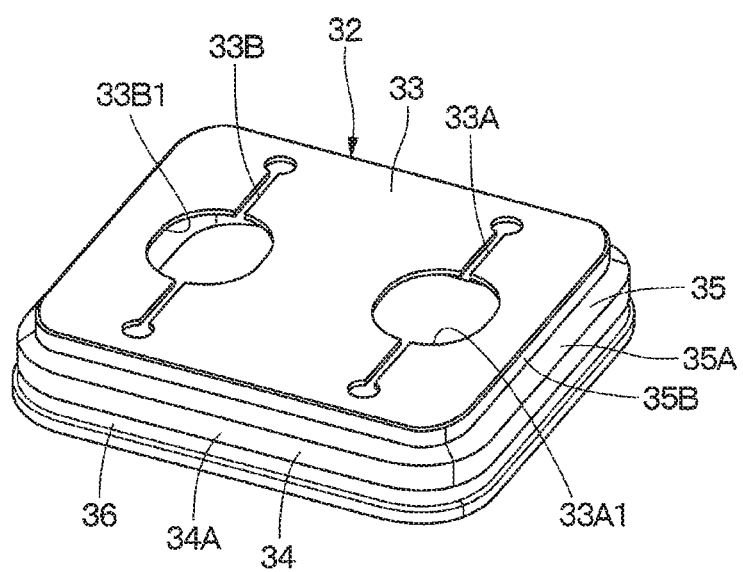
FIG. 8 is an enlarged perspective view showing a cover member according to the first embodiment as a single unit.

The cover member 32 is provided on the mat-side opening part 19C of the floor mat 19. Moreover, the lower side portion of the cover member 32 is engaged with the floor-plate side opening part 17B provided on the upper surface plate 17 of the front frame member 13 forming a part of the floor plate 18. The cover member 32 is made of a resin material having flexibility (elasticity), for example, and is to cover the gap between the mat-side opening part 19C, the floor-plate side opening part 17B, and each of the lever parts 24 and 26 of the traveling lever pedal 21. As shown in FIGS. 7 and 8, the cover member 32 is constituted by including the flat plate part 33 which will be described later, the cylindrical part 34, the entire-circumferential stepped part 35, and the entire-circumferential recessed groove 36.

The flat plate part 33 is formed having a rectangular shape so as to cover the mat-side opening part 19C of the floor mat 19. The right slit 33A into which the right lever part 24 of the traveling lever pedal 21 is inserted, capable of tilting in the front and rear direction and the left slit 33B into which the left lever part 26 is inserted, capable of tilting in the front and rear direction are provided in this flat plate part 33 at an interval in the left and right direction. This right slit 33A is formed as a penetrating groove extending in the front and rear direction and has a circular part 33A1 having a dimension substantially equal to a diameter dimension of the right lever part 24 at a middle position where the right lever part 24 in the neutral state is disposed. On the other hand, the left slit 33B is formed as a penetrating groove extending in the front and rear direction and has a circular part 33B1 having a dimension substantially equal to a diameter dimension of the left lever part 26 at a middle position where the left lever part 26 in the neutral state is disposed.

Moreover, the flat plate part 33 has an extremely thin dimension as compared with a thickness dimension of the cylindrical part 34 which will be described later and as a result, the flat plate part 33 can be freely deformed when the lever parts 24 and 26 are tilted in the front and rear direction and can maintain a closed state between the lever parts 24 and 26 while tilting of the lever parts 24 and 26 is allowed.

Here, the flat plate part 33 is disposed at a position higher than the foot rest part 19B of the mat-side opening part 19C of the floor mat 19. As a result, even in the case where earth and sand or water collect on the foot rest part 19B of the floor mat 19, the earth and sand or water does not go up on the flat plate part 33 disposed at the high position and thus, entry of the earth and sand or water into the revolving frame 5 side through each of the slits 33A and 33B can be prevented.

The cylindrical part 34 extends downward toward the floor-plate side opening part 17B of the upper surface plate 17 (floor plate 18) from the periphery of the flat plate part 33. The cylindrical part 34 is formed as a thick rectangular frame body so as to surround the rectangular flat plate part 33. The entire-circumferential stepped part 35 and the entire-circumferential recessed groove 36, which will be described later, are formed on an outer peripheral surface 34A of the cylindrical part 34.

The entire-circumferential stepped part 35 constitutes a cover-member side seal section sealing a space between the entire-circumferential stepped part 35 and the entire-circumferential lip part 19D of the floor mat 19. This entire-circumferential stepped part 35 is located on an outer peripheral edge of the flat plate part 33 located on the upper side of the cover member 32 and is to seal the space between the entire-circumferential stepped part 35 and the entire-circumferential lip part 19D of the floor mat 19 in the liquid-tight state. The entire-circumferential stepped part 35 is formed by cutting out an outer peripheral edge of the flat plate part 33, that is, an upper side portion of the outer peripheral surface 34A of the cylindrical part 34 over the entire circumference. As a result, the entire-circumferential stepped part 35 is constituted by a bottom surface 35A faced in close contact with the lower surface 19D2 of the entire-circumferential lip part 19D and an outer side surface 35B faced in close contact with the inner side surface 19D3 of the entire-circumferential lip part 19D. The bottom surface 35A is inclined downward toward the outer side in accordance with inclination of the lower surface 19D2.

The entire-circumferential recessed groove 36 constitutes the floor-plate side engaging section with which the entire-circumferential engaging protrusion part 17C of the upper surface plate 17 (floor plate 18) is engaged. This entire-circumferential recessed groove 36 is located on the lower side of the cylindrical part 34 and is formed by denting the outer peripheral surface 34A over the entire circumference. The entire-circumferential recessed groove 36 fixes the cover member 32 to the floor-plate side opening part 17B of the upper surface plate 17 in the positioned state by being engaged (fitted) with the entire-circumferential engaging protrusion part 17C provided on the floor-plate side opening part 17B of the upper surface plate 17.

The cover member 32 constituted as above causes the entire-circumferential recessed groove 36 to be engaged with the entire-circumferential engaging protrusion part 17C of the upper surface plate 17 while deforming the lower side portion of the cylindrical part 34. After the cover member 32 is fixed to the upper surface plate 17, the mat-side opening part 19C of the floor mat 19 is externally fitted with the cover member 32. At this time, sealing in the liquid-tight state can be realized by close contact between the entire-circumferential lip part 19D of the floor mat 19 and the entire-circumferential stepped part 35 of the cover member 32.

It should be noted that as shown in FIG. 1 and FIG. 2, an earth removing plate device 37 is to perform a leveling work and is provided on the front side of the lower traveling structure 2, capable of moving upward/downward. An operating pedal 38 is provided on the right side of the traveling lever pedal 21 and is used for swing of the front device 4, the upward/downward movement of the earth removing plate device 37, and an operation of an additional hydraulic device (not shown). Moreover, a cab 39 is to cover the periphery and the upper side of the operator's seat 10 and has a door 39A opened/closed at getting on/off is provided on a left side surface.

The small-sized hydraulic excavator 1 according to this embodiment has the constitution as described above and subsequently, an operation of the hydraulic excavator 1 will be described.

The operator seated on the operator's seat 10 starts the engine 7 and drives the hydraulic pump 8. As a result, the pressurized oil from the hydraulic pump 8 is supplied to the control valve group 20. When the operator operates the lever parts 24 and 26 of the traveling lever pedal 21, the pressurized oil from the hydraulic pump 8 is supplied from the corresponding control valve 20A to the hydraulic motor of the lower traveling structure 2, whereby this lower traveling structure 2 can be advanced or retreated. On the other hand, the front device 4 can be operated so as to perform the excavating work of earth and sand by operating the control levers 11 and 12 for work.

Then, according to this embodiment, the floor-plate side opening part 17B into which each of the lever parts 24 and 26 of the traveling lever pedal 21 is inserted is provided on the front side position of the floor plate 18, that is, in the upper surface plate 17 of the front frame member 13. Moreover, the mat-side opening part 19C is provided on the floor mat 19 at the position corresponding to the floor-plate side opening part 17B. The cover member 32 made of the flat plate part 33 covering this mat-side opening part 19C and having the slits 33A and 33B into which each of the lever parts 24 and 26 of the traveling lever pedal 21 is tiltably inserted in the front and rear direction and the cylindrical part 34 extending downward from the flat plate part 33 toward the floor-plate side opening part 17B of the upper surface plate 17 is provided on the mat-side opening part 19C of the floor mat 19.

Moreover, the entire-circumferential lip part 19D which becomes the floor-mat side seal section is provided on the mat-side opening part 19C of the floor mat 19. Furthermore, the entire-circumferential stepped part 35 as the cover-member side seal section sealing the space between the entire-circumferential stepped part 35 and the entire-circumferential lip part 19D of the floor mat 19 in the liquid-tight state is provided on the outer peripheral edge of the flat plate part 33 of the cover member 32.

Furthermore, the entire-circumferential engaging protrusion part 17C as the floor-plate side engaging section is provided on the floor-plate side opening part 17B of the upper surface plate 17. Moreover, the entire-circumferential recessed groove 36 as the cover-member side engaging section engaged with the entire-circumferential engaging protrusion part 17C of the upper surface plate 17 is provided on the cylindrical part 34 of the cover member 32.

Accordingly, in this embodiment, the gap between the mat-side opening part 19C of the floor mat 19 and each of the lever parts 24 and 26 can be closed by the flat plate part 33 of the cover member 32. This cover member 32 can keep the height dimension low as compared with the bellows-shaped boot described in Patent Document 1, and the mounting position of each of the pedal parts 25 and 27 to each of the lever parts 24 and 26 can be made lower.

As a result, each of the pedal parts 25 and 27 of the traveling lever pedal 21 can be disposed at a position close to the floor mat 19 and thus, the operator can place the foot on each of the pedal parts 25 and 27 easily. Thereby, the step-on operation when causing the lower traveling structure 2 to travel can be performed easily and accurately, and operability of the traveling lever pedal 21 can be improved.

Moreover, the entire-circumferential stepped part 35 on the outer peripheral edge of the flat plate part 33 and the entire-circumferential lip part 19D provided on the mat-side opening part 19C of the floor mat 19 and engaged with the entire-circumferential stepped part 35 can seal the space between the mat-side opening part 19C of the floor mat 19 and the cover member 32 in the liquid-tight state. As a result, the entire-circumferential stepped part 35 and the entire-circumferential lip part 19D can prevent entry of the earth and sand, water or the like on the floor mat 19 to the lower side of the floor mat 19 and can reduce a labor required for a cleaning work.

On the other hand, the entire-circumferential recessed groove 36 provided in the outer peripheral surface 34A of the cylindrical part 34 in the cover member 32 and the entire-circumferential engaging protrusion part 17C provided on the floor-plate side opening part 17B of the upper surface plate 17 and engaged with the entire-circumferential recessed groove 36 can be engaged with each other. As a result, the cover member 32 can be fixed to the floor-plate side opening part 17B of the upper surface plate 17 in the positioned state with simple constitutions without using a fixing tool such as a bolt and a hook.

Moreover, the entire-circumferential lip part 19D of the floor mat 19 is constituted as an inclined lip part extending diagonally upward toward the entire-circumferential stepped part 35 of the cover member 32. As a result, the upper surface 19D1 of the entire-circumferential lip part 19D can move the earth and sand or water to the lower side and remove them by the inclination. Moreover, movement of the earth and sand or water to the flat plate part 33 side of the cover member 32 can be suppressed. Furthermore, since accumulation of the earth and sand can be prevented, appearance can be improved.

The flat plate part 33 of the cover member 32 is disposed at a position higher than the foot rest part 19B of the floor mat 19. Accordingly, even in the case where the earth and sand or water collect on the foot rest part 19B of the floor mat 19, entry of the earth and sand or water to the revolving frame 5 side through each of the slits 33A and 33B can be prevented, and the upper surface of the revolving frame 5 can be kept clean.

The control valve group 20 for supplying/discharging the pressurized oil to the lower traveling structure 2 in accordance with the operation of the traveling lever pedal 21 is provided on the revolving frame 5. The rotational shaft 22 of the traveling lever pedal 21 and the control valve 20A for controlling the hydraulic motor for traveling in the control valve group 20 can be mechanically connected by the rotational piece 28 extending in the radial direction from the rotational shaft 22 and the rod 29 connecting the rotational piece 28 and the pilot part 20A1 of the control valve 20A. On the other hand, the cylindrical rotational shaft 23 and another control valves 20A for controlling the hydraulic motor for traveling in the control valve group 20 can be mechanically connected by the rotational piece 30 extended in the radial direction from the cylindrical rotational shaft 23 and the rod 31 connecting the rotational piece 30 and the pilot part 20A1 of the another control valve 20A.

Figure 9:
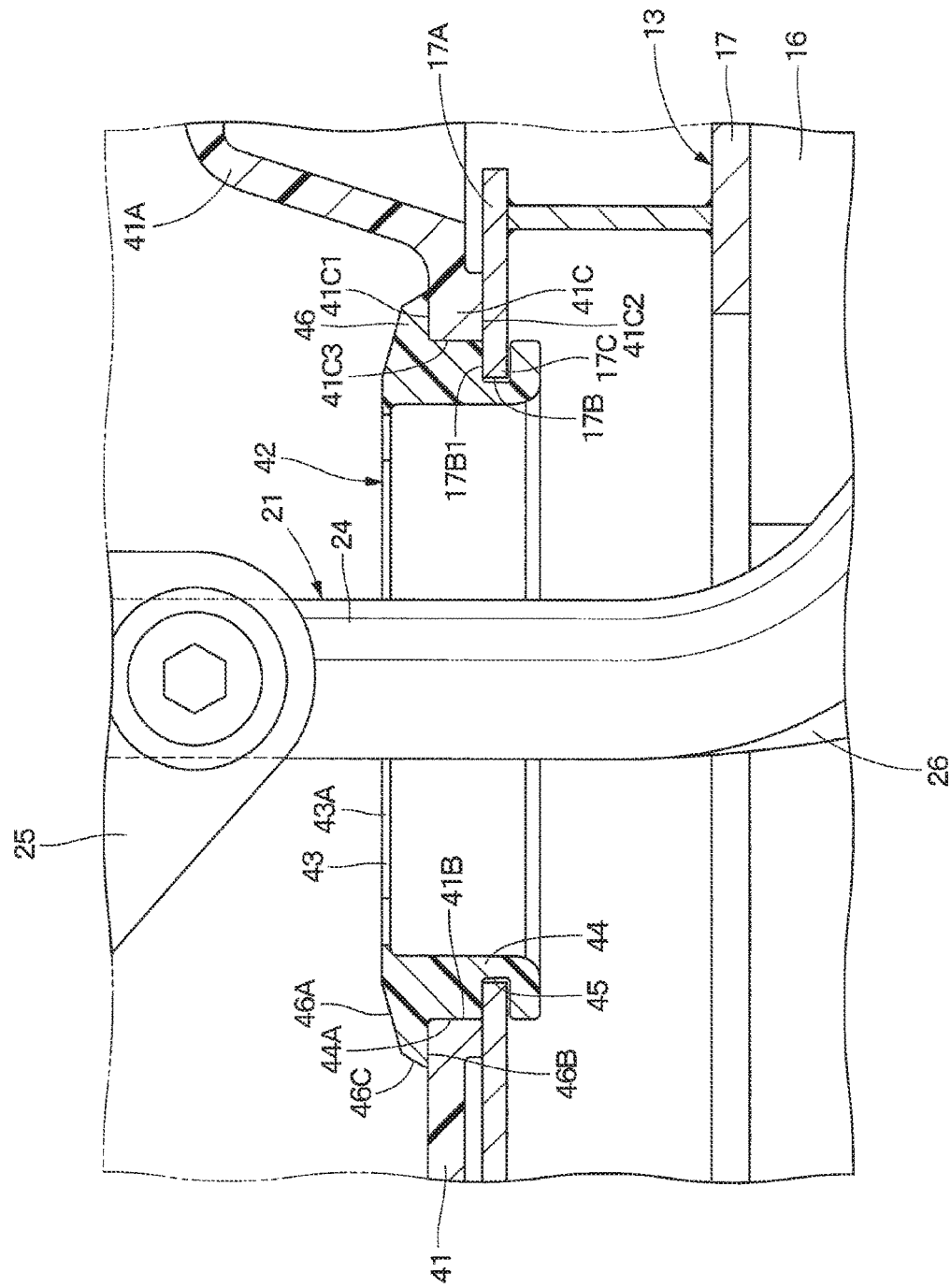
FIG. 9 is a sectional view of an enlarged essential part of a floor mat and a cover member according to a second embodiment when seen from a position similar to that in FIG. 7.
Figure 10:
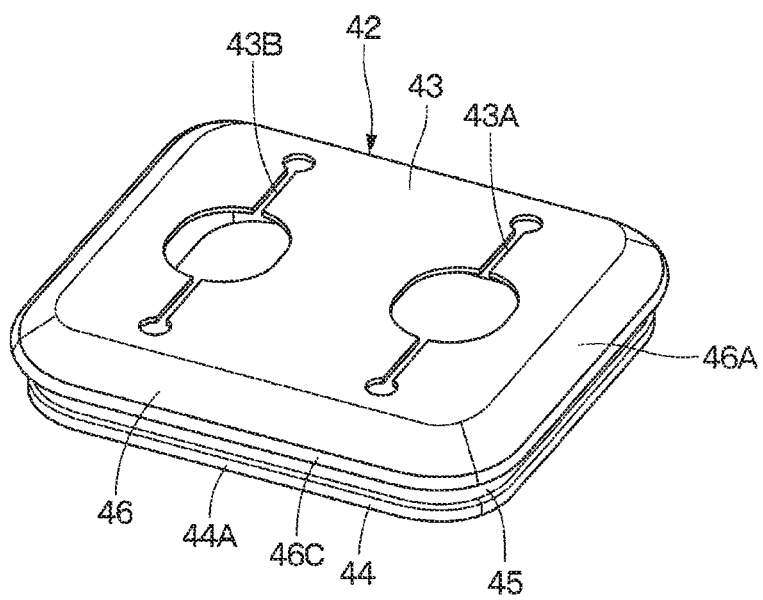
FIG. 10 is an enlarged perspective view showing the cover member according to the second embodiment as a single unit.

Subsequently, FIG. 9 and FIG. 10 show a second embodiment of the present invention. A characteristic of this embodiment is that the cover-member side seal section is formed by an entire-circumferential flange part extending outward from the entire circumference of the flat plate part toward the floor mat, and the floor-mat side seal section is formed by an entire-circumferential gripped part located on the mat-side opening part of the floor mat and gripped between the entire-circumferential flange part and an upper surface in the vicinity of the floor-plate side opening part of the floor plate. In this embodiment, the component elements that are identical to those of the aforementioned first embodiment will be simply denoted by the same reference numerals and the explanation will be omitted.

In FIG. 9 and FIG. 10, a floor mat 41 according to the second embodiment includes a frame member 41A, a foot rest part (not shown), and a mat-side opening part 41B substantially similarly to the floor mat 19 in the first embodiment. This floor mat 41 is formed having a rectangular shape lengthy in the left and right direction by using a resin material (rubber material) having elasticity. However, the floor mat 41 according to the second embodiment is different from the floor mat 19 according to the first embodiment in a point that the entire-circumferential lip part is not formed at a position of the mat-side opening part 41B.

An entire-circumferential gripped part 41C gripped between an entire-circumferential flange part 46 of a cover member 42 which will be described later and an upper surface 17B1 in the vicinity of the floor-plate side opening part 17B in the upper surface plate 17 forming a part of the floor plate 18 is formed on the mat-side opening part 41B of the floor mat 41. This entire-circumferential gripped part 41C is brought into contact with the entire-circumferential flange part 46 and constitutes a floor-mat side seal section sealing a space between the floor mat 41 and the cover member 42 in the liquid-tight state.

The entire-circumferential gripped part 41C has an upper surface 41C1 faced with a lower surface 46B of the entire-circumferential flange part 46, a lower surface 41C2 faced with the upper surface 17B1 in the vicinity of the floor-plate side opening part 17B, and an inner peripheral surface 41C3 faced with an outer peripheral surface 44A of a cylindrical part 44 in the cover member 42.

The cover member 42 according to the second embodiment is formed by using a resin material having flexibility (elasticity) substantially similarly to the cover member 32 according to the first embodiment and is constituted by including a flat plate part 43, the cylindrical part 44, and an entire-circumferential recessed groove 45. However, the cover member 42 according to the second embodiment is different from the cover member 32 according to the first embodiment in a point that the entire-circumferential flange part 46 is formed on the entire circumference of the flat plate part 43. It should be noted that the flat plate part 43 has a right slit 43A and a left slit 43B, and the cylindrical part 44 has the outer peripheral surface 44A.

The entire-circumferential flange part 46 of the cover member 42 constitutes the cover-member side seal section. This entire-circumferential flange part 46 extends outward from the entire circumference of the flat plate part 43 toward the floor mat 41. The entire-circumferential flange part 46 has an upper surface 46A, a lower surface 46B, and an outer peripheral surface 46C.

The upper surface 46A of the entire-circumferential flange part 46 is constituted as an inclined surface extending diagonally downward toward the upper surface 41C1 of the entire-circumferential gripped part 41C of the floor mat 41. As a result, the upper surface 46A can move the earth and sand or water to the lower side and remove them by the inclination. Moreover, movement of the earth and sand or water to the flat plate part 43 side can be suppressed.

The entire-circumferential flange part 46 can seal the space between the mat-side opening part 41B (entire-circumferential gripped part 41C) of the floor mat 41 and the cover member 42 in the liquid-tight state by bringing its lower surface 46B into close contact with the upper surface 41C1 of the entire-circumferential gripped part 41C.

Then, in the second embodiment constituted as above can also obtain working effects substantially similar to those in the aforementioned first embodiment. Particularly, according to the second embodiment, it is constituted such that the entire-circumferential flange part 46 extending outward from the entire circumference of the flat plate part 43 toward the floor mat 41 is provided, and the entire-circumferential gripped part 41C located on the mat-side opening part 41B of the floor mat 41 and gripped between the entire-circumferential flange part 46 and the upper surface 17B1 in the vicinity of the floor-plate side opening part 17B of the upper surface plate 17 is provided. As a result, the entire-circumferential gripped part 41C and the entire-circumferential flange part 46 can prevent entry of the earth and sand, water and the like on the floor mat 41 to the lower side of the floor mat 41, and a labor required for the cleaning work can be reduced.

Further, in the entire-circumferential flange part 46, the upper surface 46A is constituted as the inclined surface extending diagonally downward toward the upper surface 41C1 of the entire-circumferential gripped part 41C. Accordingly, the upper surface 46A of the entire-circumferential flange part 46 can move the earth and sand or water to the lower side and remove them by the inclination. Moreover, movement of the earth and sand or water to the flat plate part 43 side of the cover member 42 can be suppressed.

It should be noted that in the first embodiment, the case constituted such that the pilot part 20A1 of the control valve 20A in the control valve group 20 and the traveling lever pedal 21 are directly (mechanically) connected through the rotating pieces 28 and 30 and the rods 29 and 31 is exemplified. However, the present invention is not limited to that and may be constituted such that the pilot part 20A1 of the control valve 20A in the control valve group 20 and the traveling lever pedal 21 are connected by using a wire cable or the like, for example. This constitution can be applied also to the second embodiment.

In each of the embodiments, the small-sized hydraulic excavator 1 with the cab specification including the cab 39 covering the periphery and the upper side of the operator's seat 10 is exemplified. However, the present invention is not limited to that and can be applied also to a small-sized hydraulic excavator with a canopy specification including a canopy covering the upper side of the operator's seat. Moreover, it can be applied also to a hydraulic excavator of a type not including a cab or a canopy.

Further, in each of the embodiments, the small-sized hydraulic excavator 1 including the crawler-type lower traveling structure 2 is described as an example of a small-sized construction machine. However, the present invention is not limited to that and may be applied also to a small-sized hydraulic excavator including a wheel-type lower traveling structure, for example.

DESCRIPTION OF REFERENCE NUMERALS

1: Small-sized hydraulic excavator (Small-sized construction machine)
2: Lower traveling structure
3: Upper revolving structure
4: Front device
5: Revolving frame
6: Counterweight
7: Engine (Prime mover)
8: Hydraulic pump
9: Operator's seat platform
10: Operator's seat
13: Front frame member
14: Lower surface plate (Revolving frame)
17: Upper surface plate (Floor plate)
17B: Floor-plate side opening part
17B1: Upper surface
17C: Entire-circumferential engaging protrusion part (Floor-plate side engaging section)
18: Floor plate
19, 41: Floor mat
19B: Foot rest part
19C, 41B: Mat-side opening part
19D: Entire-circumferential lip part (Floor-mat side seal section)
20: Control valve group
20A: Control valve
20A1: Pilot part
21: Traveling lever pedal
22: rotational shaft
23: Cylindrical rotational shaft
24: Right lever part
25: Right pedal part
26: Left lever part
27: Left pedal part
28, 30: Rotational piece
29, 31: Rod
32, 42: Cover member
33, 43: Flat plate part
33A, 43A: Right slit
33B, 43B: Left slit
34, 44: Cylindrical part
34A, 44A: Outer peripheral surface
35: Entire-circumferential stepped part (Cover-member side seal section)
36, 45: Entire-circumferential recessed groove (Cover-member side engaging section)
41C: Entire-circumferential gripped part (Floor-mat side seal section)
46: Entire-circumferential flange part (Cover-member side seal section)

The invention claimed is:

1. A small-sized construction machine comprising:
an automotive lower traveling structure;
an upper revolving structure rotatably mounted on said lower traveling structure; and
a front device provided on a front side of said upper revolving structure, wherein
said upper revolving structure includes:
a revolving frame forming a support structural body;
a counterweight provided on a rear side of said revolving frame in order to take a balance with said front device;
a prime mover provided on a front side of said counterweight and on said revolving frame;
an operator's seat platform provided by covering an upper side of said prime mover and having an operator's seat;
a floor plate provided on a front side of said operator's seat platform and on said revolving frame;
a floor mat provided on said floor plate; and
a traveling lever pedal supported by said revolving frame on a front side of said revolving frame, having a lever part having a rotational shaft which becomes a rotational center on a side lower than said floor plate and having a base end mounted on said rotational shaft and a distal end protruding upward through said floor mat, said lever part being tilted in a front and rear direction so as to operate traveling of said lower traveling structure; characterized in that:
said floor plate is provided with a floor-plate side opening part through which said lever part of said traveling lever pedal is inserted at a front-side position;
said floor mat is provided with a mat-side opening part at a position corresponding to said floor-plate side opening part;
a cover member including a flat plate part covering said mat-side opening part and having a slit through which said lever part of said traveling lever pedal is tiltably inserted in said front and rear direction and a cylindrical part extending downward from said flat plate part toward said floor-plate side opening part of said floor plate is provided on said mat-side opening part of said floor mat;
a floor-mat side seal section is provided on said mat-side opening part of said floor mat;
a cover-member side seal section sealing a space with said floor-mat side seal section of said floor mat in a liquid-tight state is provided on an outer peripheral edge of said flat plate part of said cover member;
a floor-plate side engaging section is provided on said floor-plate side opening part of said floor plate; and
a cover-member side engaging section engaged with said floor-plate side engaging section of said floor plate is provided on said cylindrical part of said cover member.

2. The small-sized construction machine according to claim 1, wherein
said flat plate part of said cover member is disposed at a position higher than a foot rest part of said floor mat.

3. The small-sized construction machine according to claim 1, wherein
said cover-member side seal section is formed by an entire-circumferential stepped part obtained by cutting out said outer peripheral edge of said flat plate part over the entire circumference; and
said floor-mat side seal section is formed by an entire-circumferential lip part protruding inward from said mat-side opening part of said floor mat toward said entire-circumferential stepped part and engaged with said entire-circumferential stepped part.

4. The small-sized construction machine according to claim 1, wherein
said cover-member side seal section is formed by an entire-circumferential flange part extending outward from the entire circumference of said flat plate part toward said floor mat; and
said floor-mat side seal section is formed by an entire-circumferential gripped part located on said mat-side opening part of said floor mat and gripped between said entire-circumferential flange part and an upper surface in the vicinity of said floor-plate side opening part of said floor plate.

5. The small-sized construction machine according to claim 1, wherein said cover-member side engaging section is formed by an entire-circumferential recessed groove recessed over the entire circumference of an outer peripheral surface of said cylindrical part of said cover member; and said floor-plate side engaging section is formed by an entire-circumferential engaging protrusion part protruding toward said entire-circumferential recessed groove on said floor-plate side opening part of said floor plate and engaged with said entire-circumferential recessed groove.

6. The small-sized construction machine according to claim 1, wherein a control valve for supplying/discharging a pressurized oil to said lower traveling structure in accordance with an operation of said traveling lever pedal is provided on said revolving frame; and a rotational shaft of said traveling lever pedal and said control valve are mechanically connected by a rotational piece extending in a radial direction from said rotational shaft and a rod connecting said rotational piece and a pilot part of said control valve.

* * * * *